(12) United States Patent
Gilliland et al.

(10) Patent No.: US 12,179,531 B2
(45) Date of Patent: *Dec. 31, 2024

(54) MANUAL HITCHES AND VEHICLES INCORPORATING THE SAME

(71) Applicant: Crown Equipment Corporation, New Bremen, OH (US)

(72) Inventors: Kevin Gilliland, Coldwater, OH (US); Adam Wietholter, Marysville, OH (US); Michael Grover, Chickasaw, OH (US)

(73) Assignee: Crown Equipment Corporation, New Bremen, OH (US)

( * ) Notice: Subject to any disclaimer, the term of this patent is extended or adjusted under 35 U.S.C. 154(b) by 727 days.

This patent is subject to a terminal disclaimer.

(21) Appl. No.: 17/477,707

(22) Filed: Sep. 17, 2021

(65) Prior Publication Data
US 2023/0092293 A1    Mar. 23, 2023

(51) Int. Cl.
*B60D 1/58*    (2006.01)
*B60D 1/04*    (2006.01)

(52) U.S. Cl.
CPC ............ *B60D 1/583* (2013.01); *B60D 1/04* (2013.01)

(58) Field of Classification Search
CPC . B60D 1/583; B60D 1/02; B60D 1/04; B60D 1/30; B60D 1/363; B60D 1/246;
(Continued)

(56) References Cited

U.S. PATENT DOCUMENTS 291,149 A    1/1884   Carlough
827,431 A *  7/1906   Evensen
(Continued)

FOREIGN PATENT DOCUMENTS

CN    105711359 A    6/2016
CN    114435041 A    5/2022
(Continued)

OTHER PUBLICATIONS

International Search Report and Written Opinion issued by the European Patent Office acting as International Searching Authority for related International Patent Application No. PCT/US2022/043082 dated Dec. 21, 2022 14 total pages.
(Continued)

*Primary Examiner* — Anne Marie M Boehler
(74) *Attorney, Agent, or Firm* — Dinsmore & Shohl LLP

(57) ABSTRACT

A materials handling vehicle comprising a hitch, and a drive mechanism. The hitch comprises a latch and a receiving member. The latch is positionable between open and closed positions. The receiving member comprises a pair of inwardly curved side scoops and a central incline member provided between the pair of inwardly curved side scoops, each inwardly curved side scoop having an upper surface, a lower surface opposite the upper surface, an inner surface, an outer surface opposite the inner surface, a rear surface, and a front surface opposite the rear surface. The rear and upper surfaces of the pair of inwardly curved side scoops define an open rear end of the receiving member, the upper surface being sloped at the open rear end. The central incline member and the upper surface of the pair of inwardly curved side scoops cooperate to lead a cart hook to engage the latch.

28 Claims, 11 Drawing Sheets

(58) Field of Classification Search
CPC .... B60D 1/36; B60D 1/481; B60D 2001/005; B60D 2001/001
USPC .............................................. 280/477, 479.3
See application file for complete search history.

(56) References Cited

U.S. PATENT DOCUMENTS

| | | | |
|---|---|---|---|
| 1,626,993 A * | 5/1927 | Williams | B60D 1/363 280/477 |
| 1,848,956 A * | 3/1932 | Koehler | B60D 1/04 280/514 |
| 2,951,711 A | 9/1960 | Karnath et al. | |
| 3,325,186 A | 6/1967 | Melvin | |
| 3,744,819 A | 7/1973 | Cook et al. | |
| 4,792,151 A * | 12/1988 | Feld | B60D 1/065 280/509 |
| 5,161,815 A * | 11/1992 | Penor, Jr. | B60D 1/07 280/405.1 |
| 7,677,588 B2 | 3/2010 | Coers et al. | |
| 9,211,772 B2 | 12/2015 | Brown et al. | |
| 9,566,838 B2 | 2/2017 | Scarth et al. | |
| 9,944,139 B2 | 4/2018 | Tindall | |
| 10,059,161 B1 | 8/2018 | Salter et al. | |
| 10,308,086 B2 | 6/2019 | Tiainen | |
| 11,987,084 B2 * | 5/2024 | Gilliland | B60D 1/363 |
| 2003/0178810 A1 | 9/2003 | Reiter | |
| 2021/0017007 A1 | 1/2021 | Houston et al. | |
| 2022/0001708 A1 * | 1/2022 | Hak | B60D 1/62 |

FOREIGN PATENT DOCUMENTS

| | | | |
|---|---|---|---|
| DE | 102005028026 A1 | 12/2006 | |
| DE | 102016108182 A1 | 11/2017 | |
| DE | 102018222278 A1 | 6/2020 | |
| EP | 0388848 B1 | 12/1993 | |
| EP | 1103494 A1 | 5/2001 | |
| EP | 0823343 B1 | 11/2001 | |
| EP | 1468848 A1 | 10/2004 | |
| EP | 1495884 A1 | 1/2005 | |
| EP | 1627847 B1 | 1/2010 | |
| EP | 2586634 A1 | 5/2013 | |
| EP | 3047986 A1 | 7/2016 | |
| EP | 3418082 A1 * | 12/2018 | ............... B60D 1/02 |
| EP | 3932701 A1 | 1/2022 | |
| GB | 366352 A | 2/1932 | |
| GB | 1558709 | 1/1980 | |
| WO | 2018/021474 A1 | 2/2018 | |
| WO | 2020010047 A1 | 1/2020 | |
| WO | 2022/027141 A1 | 2/2022 | |

OTHER PUBLICATIONS

International Search Report and Written Opinion issued by the European Patent Office acting as International Searching Authority for related International Patent Application No. PCT/US2022/043076 dated Dec. 5, 2022 14 total pages.

* cited by examiner

MANUAL HITCHES AND VEHICLES INCORPORATING THE SAME

BACKGROUND

The present disclosure relates to materials handling vehicles configured to engage goods in a warehouse environment and move goods along an inventory transit surface in the warehouse environment. Materials handling vehicles such as, for example, tuggers, may be unmanned and engage a cart, via a hitch, at a rear of the materials handling vehicle to navigate the cart to a target destination. However, these materials handling vehicles may not accurately engage a cart. Maneuverability, such as a turning radius, of these materials handling vehicles may be limited by the specific manner in which the materials handling vehicles engage the cart.

Although the concepts of the present disclosure are described herein with primary reference to tuggers, it is contemplated that particular concepts of the present disclosure will enjoy applicability to pallet trucks with other types of motor configurations.

BRIEF SUMMARY

In accordance with one embodiment of the present disclosure, a materials handling vehicle includes a hitch, and a drive mechanism, wherein: the hitch includes a latch and a receiving member; the latch is positionable between an open position and a closed position; the receiving member includes a pair of inwardly curved side scoops and a central incline member provided between the pair of inwardly curved side scoops, each inwardly curved side scoop having an upper surface, a lower surface opposite the upper surface, an inner surface, an outer surface opposite the inner surface, a rear surface, and a front surface opposite the rear surface; the rear surface and the upper surface of the pair of inwardly curved side scoops define an open rear end of the receiving member, the upper surface being sloped at the open rear end; and the central incline member and the upper surface of the pair of inwardly curved side scoops cooperate to lead a cart hook to engage the latch.

In accordance with another embodiment of the present disclosure, a hitch includes a latch and a receiving member, wherein: the latch is positionable between an open position and a closed position; the receiving member includes a pair of inwardly curved side scoops and a central incline member provided between the pair of inwardly curved side scoops, each inwardly curved side scoop having an upper surface, a lower surface opposite the upper surface, an inner surface, an outer surface opposite the inner surface, a rear surface, and a front surface opposite the rear surface; the rear surface and the upper surface of the pair of inwardly curved side scoops define an open rear end of the receiving member, the upper surface being sloped at the open rear end; and the central incline member and the upper surface of the pair of inwardly curved side scoops cooperate to lead a cart hook to engage the latch.

In accordance with another embodiment of the present disclosure, a materials handling vehicle includes a hitch, and a drive mechanism, wherein: the hitch includes a latch, and a receiving member; the latch is positionable between an open position and a closed position; the receiving member includes a pair of inwardly curved side scoops; and the receiving member is configured such that a trailing arm of a cart hook is guided to ride up one of the pair of inwardly curved side scoops as the materials handling vehicle turns relative to the cart hook.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
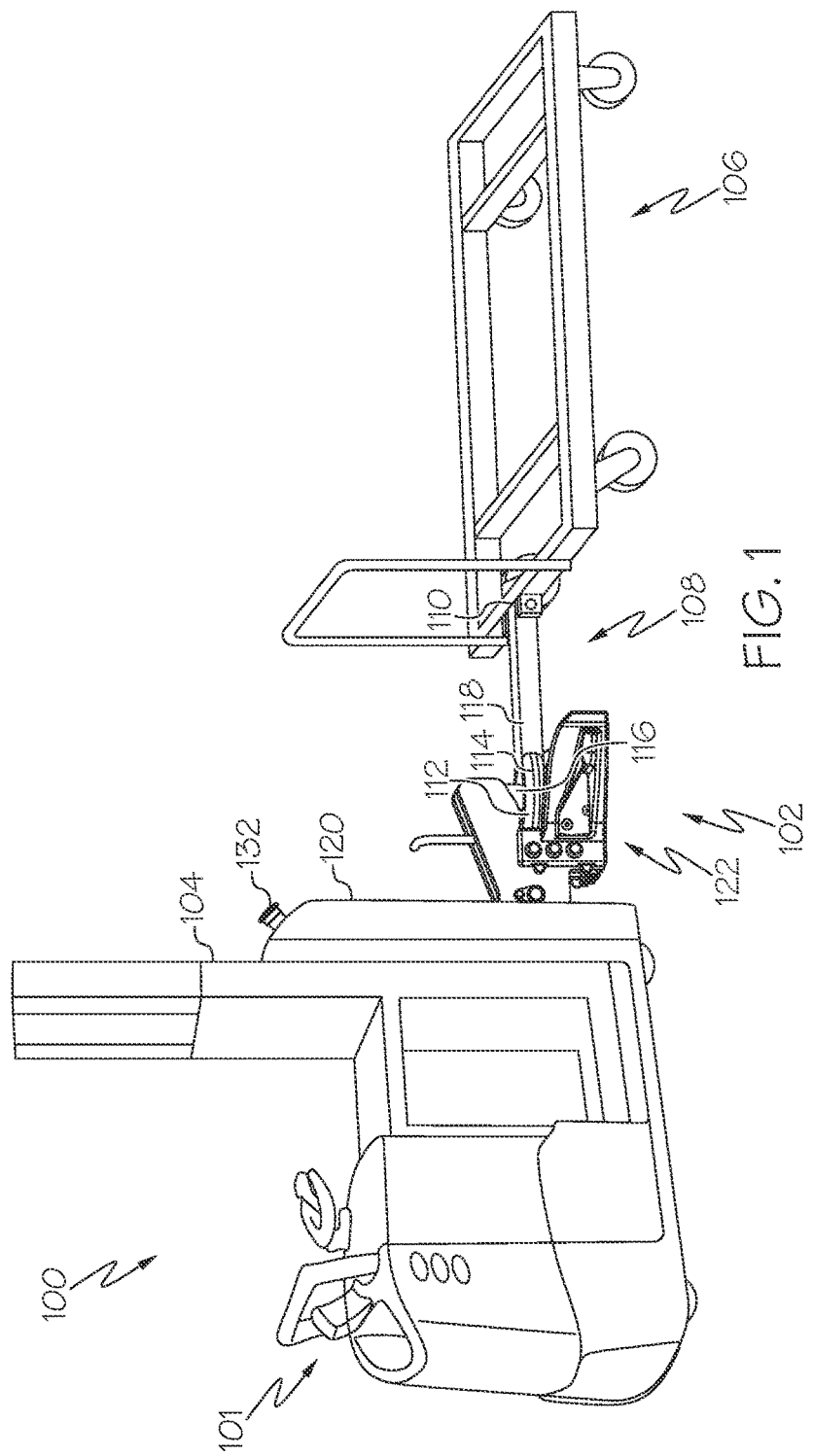
FIG. 1 schematically depicts a perspective view of a materials handling vehicle engaging a cart, according to the present disclosure.

Referring initially to FIG. 1, a materials handling vehicle 100 is shown. The materials handling vehicle 100 includes a drive mechanism 101. The materials handling vehicle 100 is configured to engage goods in a warehouse environment and the drive mechanism 120 moves goods along an inventory transit surface in the warehouse environment. Without limiting the scope of the present disclosure, the materials handling vehicle 100 may include unmanned tuggers designed to contribute to a fully automated warehouse solution and similar materials handling vehicles operating in a warehouse.

For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes.

The materials handling vehicle further includes a hitch 102 mounted to a rear end 104 of the materials handling vehicle 100. As discussed in more detail herein, the hitch 102 is configured to couple a cart 106 to the materials handling vehicle 100 such that the materials handling vehicle 100 may pull the cart 106 to a target destination.

The cart 106 includes a cart hook 108 having a first end 110 rotatably coupled to the cart 106 and a second end 112 opposite the first end 110 for engaging the hitch 102. The cart hook 108 may be rotatably coupled to the cart 106, such as by a ball joint or the like, such that the cart hook 108 may move relative to the cart 106 in a lateral direction and a vertical direction. The second end 112 of the cart hook 108 may include an engaging member 114 such as a ring for engaging a latch 116 of the hitch 102. The cart hook 108 includes a trailing arm 118 extending from the engaging member 114 to the first end 110 of the cart hook 108. In embodiments, the trailing arm 118 is a rigid member rotatably coupled to the cart 106 at the first end 110.

Figure 2:
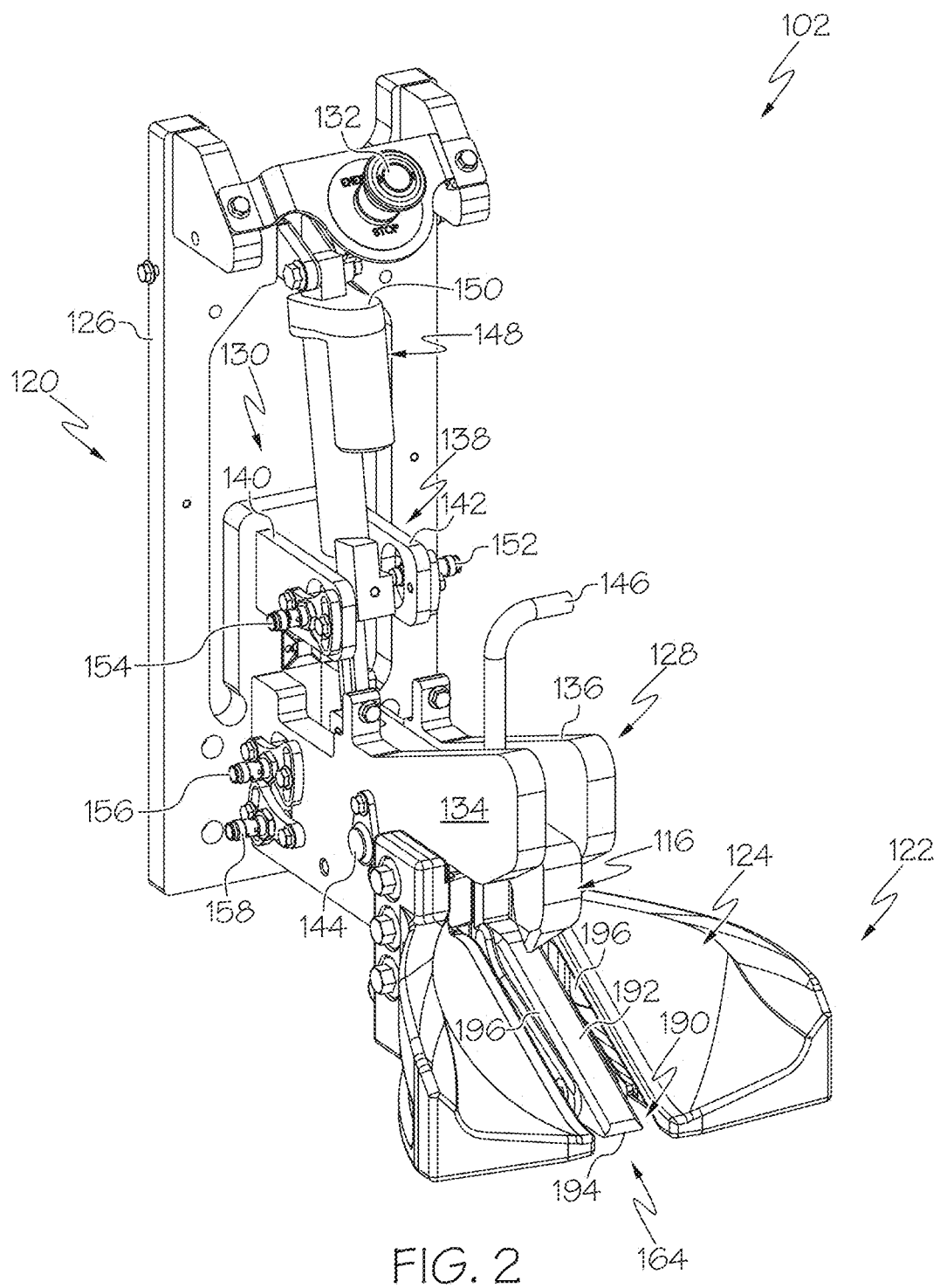
FIG. 2 schematically depicts a perspective view of a hitch of the materials handling vehicle, according to the present disclosure.
Figure 3:
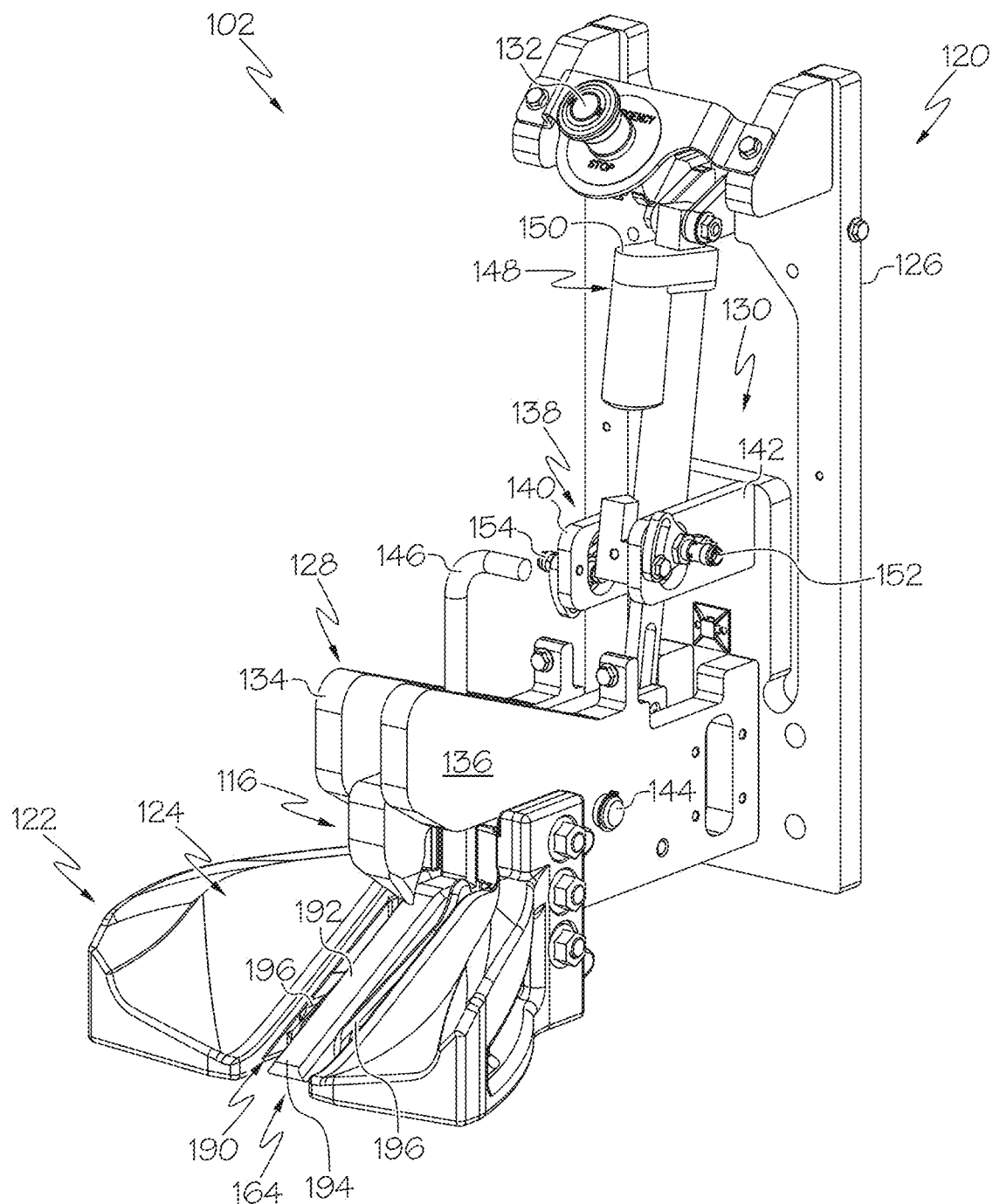
FIG. 3 schematically depicts an opposite perspective view of the hitch, according to the present disclosure.

Referring now to FIGS. 2 and 3, a perspective view of the hitch 102 is shown separate from the materials handling vehicle 100 and without the cart hook 108 engaging the latch 116. However, reference may be made to the materials handling vehicle 100 and the cart hook 108 of FIG. 1. The hitch 102 generally includes a frame 120 and a receiving member 122. The receiving member 122 is coupled to the frame 120 such that the receiving member 122 is mounted to the materials handling vehicle 100. The receiving member 122 defines a cavity 124 for receiving the second end 112 of the cart hook 108, particularly the engaging member 114, and at least partially receiving the trailing arm 118.

The frame 120 includes a back frame member 126 and an elongated frame member 128 extending substantially perpendicular to the back frame member 126. Specifically, the back frame member 126 is mounted to the rear end 104 of the materials handling vehicle 100. The back frame member 126 may include a back frame member cutout 130 for permitting various wired connections between the hitch 102 and the materials handling vehicle 100. In embodiments, an emergency stop 132 is provided at an upper portion of the hitch 102, particularly mounted to the back frame member 126. The emergency stop 132 is electrically connected to the materials handling vehicle 100, particularly a motor of the materials handling vehicle 100. As such, the emergency stop 132 may be operated from a rear of the materials handling vehicle 100, which may be out of reach of a primary operator of the materials handling vehicle 100, to immediately stop operation of the materials handling vehicle 100 in a case in which a danger arises.

In embodiments, the elongated frame member 128 may include a first elongated frame member 134 and a second elongated frame member 136 spaced apart from the first elongated frame member 134. In embodiments, the frame 120 may include a medial frame member 138 extending from the back frame member 126 above the elongated frame member 128. In embodiments, the medial frame member 138 may include a first medial frame member 140 and a second medial frame member 142 spaced apart from the first medial frame member 140.

The latch 116 of the hitch is positionable between an open position and a closed position. The latch 116 is at least partially received within the cavity 124 defined by the receiving member 122 when the latch 116 is in the closed position. In embodiments, the latch 116 may be positioned between the first elongated frame member 134 and the second elongated frame member 136. Additionally, the latch 116 is pivotally attached to at least one of the first elongated frame member 134 and the second elongated frame member 136 at a latch pivot 144.

It should be appreciated that the hitch 102 may be manually operated to be positioned between the open position and the closed position. In embodiments, a latch bar 146 extends from the latch 116 and between the first elongated frame member 134 and the second elongated frame member 136. A pulling device, such as a rope, rod, or the like, may be attached to the latch bar 146 and extend toward the materials handling vehicle 100 such that an operator of the materials handling vehicle 100 may pull the pulling device to position the latch 116 between the open position and the closed position.

In other embodiments, the latch 116 may be mechanically positionable between the open position and the closed position. Accordingly, in such embodiments, the hitch 102 may include an actuator 148 for positioning the latch 116 between the open position and the closed position. The actuator 148 may be coupled at a first end 150 thereof to the back frame member 126. Additionally, the actuator 148 may be positioned to extend between the first medial frame member 140 and the second medial frame member 142.

As discussed in more detail herein, in embodiments in which the actuator 148 is provided, the actuator 148 may be positionable between a retracted position, an intermediate position, and an extended position. When the actuator 148 is positioned into the retracted position, the latch 116 is positioned into the closed position and not permitted move into the open position. As referred to herein, the hitch 102 being in a "closed state" refers to a state in which the latch 116 is not permitted to move from the closed position to the open position. When the actuator 148 is positioned in the extended position, the latch 116 is positioned into the open position and not permitted move into the closed position. As referred to herein, the hitch 102 being in an "open state" refers to a state in which the latch 116 is not permitted to move from the open position to the closed position. Lastly, when the actuator 148 is positioned in the intermediate position, the latch 116 is freely positionable between the open position and the closed position. As referred to herein, the hitch 102 being in a "passive state" refers to a state in which the latch 116 is permitted to move between the open position to the closed position without movement of the latch 116 being restricted by the actuator 148.

Additionally, in embodiments in which the hitch 102 includes the actuator 148, the hitch 102 may be automatically operated to position the latch 116 between the open position and the closed position in response to signals detected by one or more sensors indicating the presence, or lack thereof, of the cart hook 108 received within the receiving member 122. Specifically, as discussed in more detail herein, the latch 116 may be automatically positioned into the closed position and locked in the closed position by the actuator 148, i.e., the closed state, in response to determining that the cart hook 108 has engaged the latch 116. This prevents movement of the latch 116 as the materials handling vehicle 100 traverses, for example, over a bump and the cart hook 108 unintentionally disengages the latch 116. Additionally, the latch 116 may be automatically positioned into the open position and remain in the open position by the actuator 148, i.e., the open state, to permit disengagement of the cart hook 108 from the latch 116 and removal from the hitch 102 in response to determining that the materials handling vehicle 100 has reached the target destination of the cart 106.

In embodiments in which the latch 116 may be automatically positioned between the open position and the closed position, the hitch 102 may include one or more sensors. Particularly, the hitch 102 may include a first actuator sensor 152 for detecting when the actuator 148 is in the retracted position, and a second actuator sensor 154 for detecting when the actuator 148 is in the intermediate position. It should be appreciated that the first actuator sensor 152 and the second actuator sensor 154 may be incorporated into a single actuator sensor capable of distinguishing between the actuator 148 being the retracted position and the intermediate position. The hitch 102 may also include a first latch sensor 156 for detecting when the latch 116 is in the closed position, and a second latch sensor 158 for detecting when the latch 116 is in the open position. It should be appreciated that the first latch sensor 156 and the second latch sensor 158 may be incorporated into a single latch sensor capable of distinguishing between the latch 116 being in the closed position and the open position. The hitch 102 may also include a cart hook sensor 160 (FIG. 6) for detecting the presence of the cart hook 108 within the receiving member 122.

Figure 4:
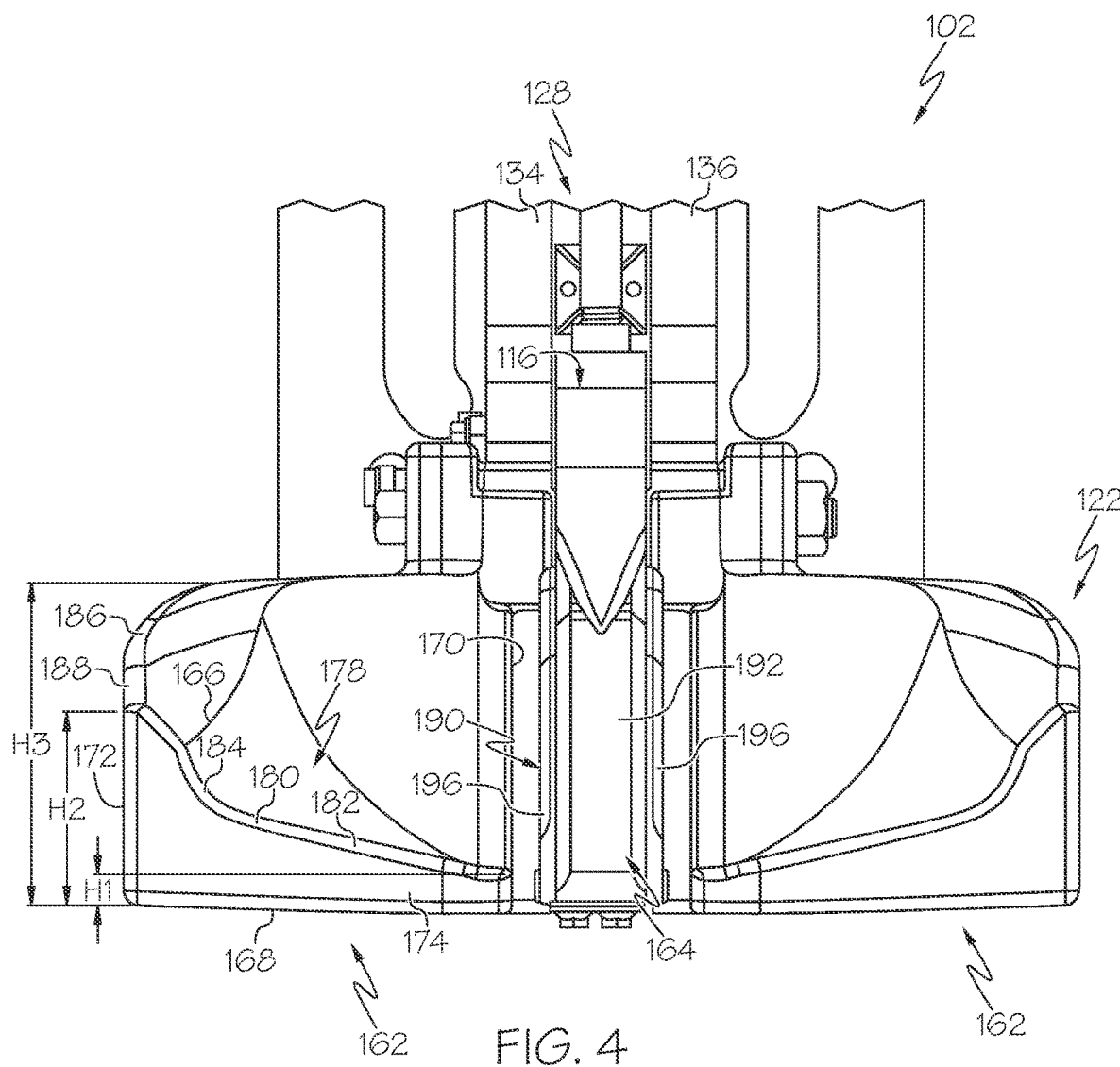
FIG. 4 schematically depicts a rear view of the hitch, according to the present disclosure.
Figure 5:
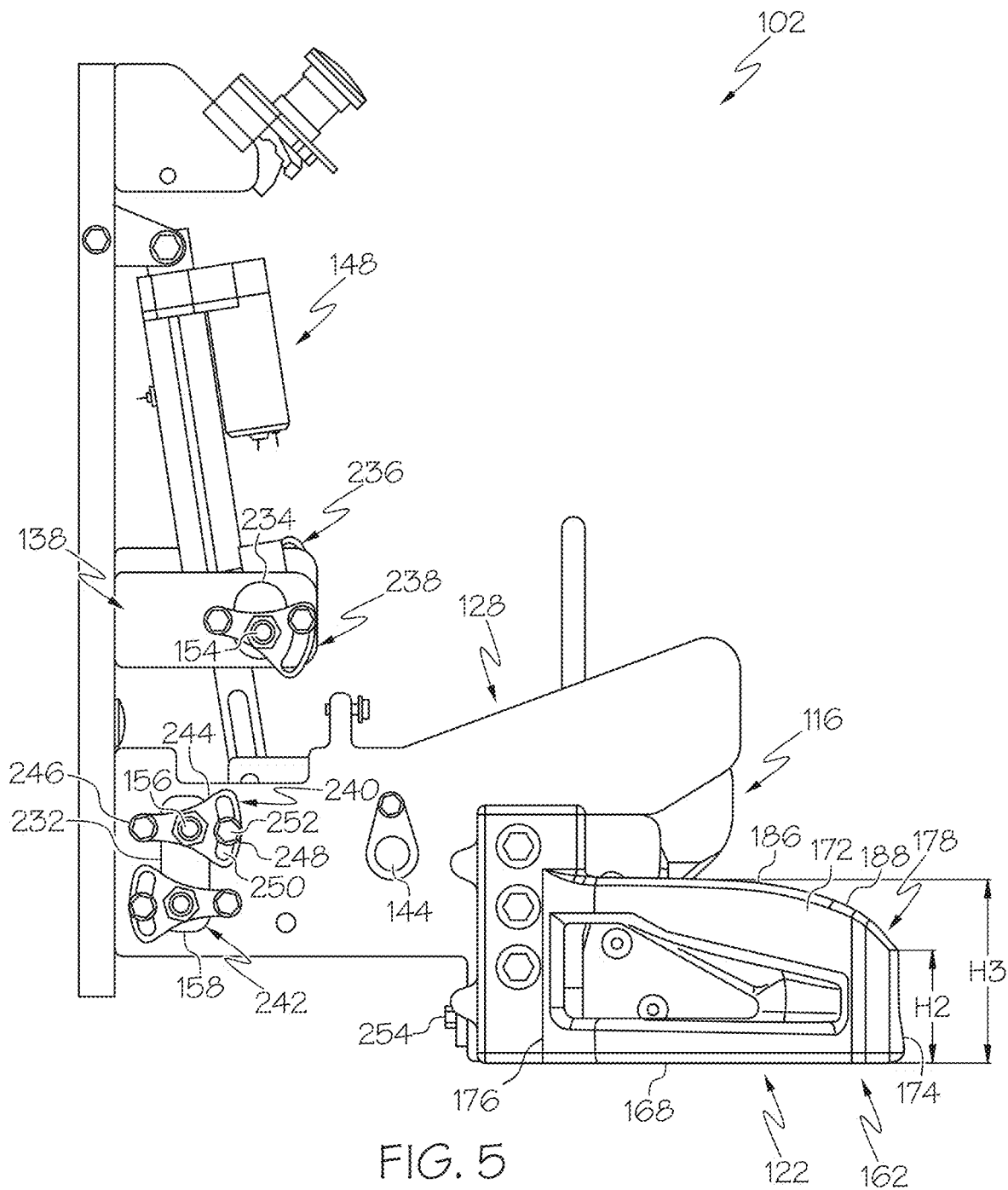
FIG. 5 schematically depicts a side view of the hitch, according to the present disclosure.

Referring now to FIGS. 4 and 5, the receiving member 122 is mounted to the frame 120, particularly the elongated frame member 128. The receiving member 122 includes a pair of inwardly curved side scoops 162 and a central incline member 164 provided between the pair of inwardly curved side scoops 162. Each inwardly curved side scoop 162 has an upper surface 166, a lower surface 168 opposite the upper surface 166, an inner surface 170, an outer surface 172 opposite the inner surface 170, a rear surface 174, and a front surface 176 opposite the rear surface 174. The rear surface 174 and the upper surface 166 of the pair of inwardly curved side scoops 162 define an open rear end 178 of the receiving member 122 for receiving the cart hook 108. The upper surface 166 is sloped at the open rear end 178. In embodiments, the upper surface 166 slopes both inwardly toward the central incline member 164 and inwardly toward the open rear end 178.

More particularly, each of the pair of inwardly curved side scoops 162 has an upper rear edge 180 formed at an intersection of the upper surface 166 and the rear surface 174. The upper rear edge 180 extends from the inner surface 170 to the outer surface 172. The upper rear edge 180 has at least one of a tapered upper rear edge portion 182 and a curved upper rear edge portion 184. In embodiments, the tapered upper rear edge portion 182 extends at least partially between the inner surface 170 to the outer surface 172. In embodiments, the curved upper rear edge portion 184 is formed in the tapered upper rear edge portion 182 between the inner surface 170 and the outer surface 172. Accordingly, the rear surface 174 has a first rear surface height H1 at the inner surface 170 proximate the central incline member 164 and a second rear surface height H2 at the outer surface 172 opposite the central incline member 164 greater than the first rear surface height H1.

Each of the pair of inwardly curved side scoops 162 has an upper outer edge 186 formed at an intersection of the upper surface 166 and the outer surface 172 opposite the central incline member 164. The upper outer edge 186 has a tapered upper outer edge portion 188 extending toward the rear surface 174. Accordingly, the outer surface 172 has a first outer surface height H3 at the front surface 176 greater than the second rear surface height H2. As discussed in more detail herein, the gradual increase in heights across the upper rear edge 180 and the upper outer edge 186 of each of the inwardly curved side scoops 162 cause the trailing arm 118 of the cart hook 108 to ride along the upper rear edge 180 and the upper outer edge 186 as the materials handling vehicle 100 turns, thereby allowing a greater turning radius of the materials handling vehicle 100 while maintaining engagement with the cart hook 108. Specifically, the latch 116 extends above the upper outer edge 186 of the each of the pair of inwardly curved side scoops 162 to permit engagement with the cart hook 108 above the upper outer edge 186 of the each of the pair of inwardly curved side scoops 162. Thus, when the materials handling vehicle 100 is in a turned position, the trailing arm 118 of the cart hook 108 is positioned above the upper rear edge 180 and the cart hook 108 maintains engagement with the latch 116.

In embodiments, a gap 190 is provided between the inner surface 170 of each of the pair of inwardly curved side scoops 162. The central incline member 164 may be provided within the gap 190. In embodiments, the central incline member 164 has a tapered upper surface 192 conforming to a slope of the upper surface 166 of the pair of inwardly curved side scoops 162 at the inner surface 170 of the pair of inwardly curved side scoops 162.

It should be appreciated that the central incline member 164 and the upper surface 166 of the pair of inwardly curved side scoops 162 cooperate to lead the cart hook 108 to engage the latch 116. More particularly, the engaging member 114 is guided to engage the latch 116 as the trailing arm 118 enters the open rear end 178 and the cavity 124 of the receiving member 122 and the engaging member 114 is not vertically and laterally aligned with the latch 116. For example, when the materials handling vehicle 100 and the cart 106 are moved toward one another and the engaging member 114 is laterally or vertically misaligned with the latch 116, the engaging member 114 contacts the upper surface 166 of one of the pair of inwardly curved side scoops 162 or the tapered upper surface 192 of the central incline member 164. Contact of the engaging member 114 with the upper surface 166 of the pair of inwardly curved side scoops 162 or the tapered upper surface 192 of the central incline member 164 directs the engaging member 114 either laterally and/or vertically into alignment with the latch 116.

Figure 6:
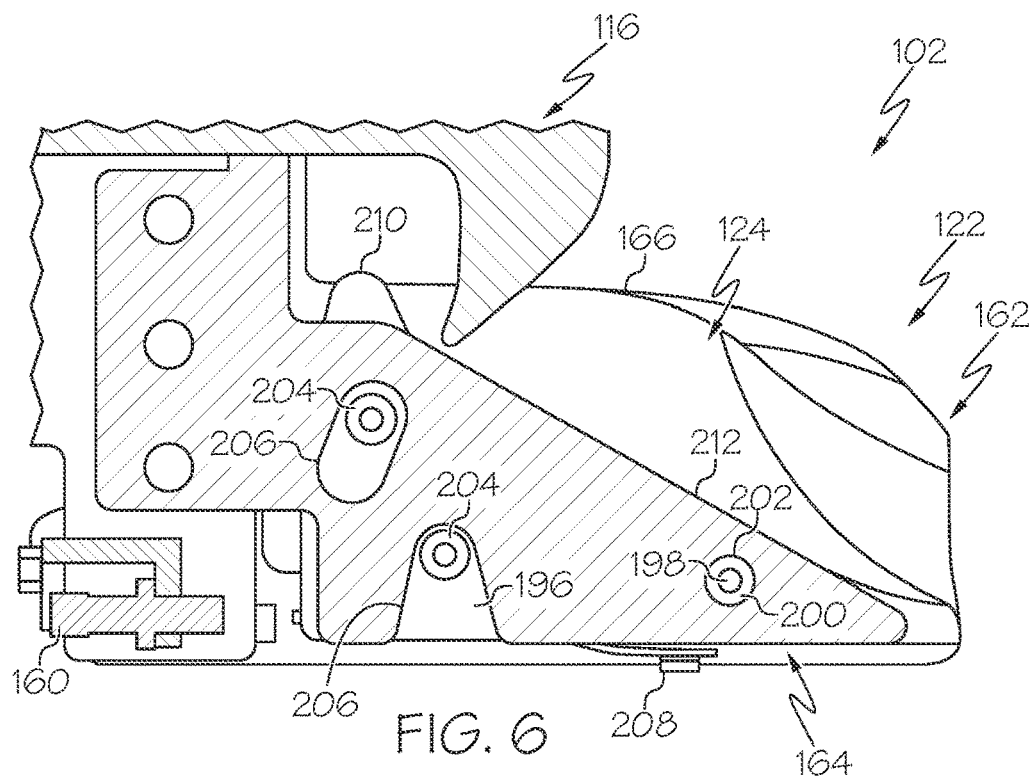
FIG. 6 schematically depicts a cross-section view of a receiving member of the hitch, according to the present disclosure.

Referring again to FIGS. 2 and 3, in embodiments, the central incline member 164 includes a fixed plate 194 and one or more pivoting plates 196 pivotally attached to the fixed plate 194. In embodiments, the central incline member 164 includes a pair of pivoting plates 196 pivotally attached to opposite sides of the fixed plate 194. Each of the pivoting plates 196 are positionable between a raised position (FIG. 6) and a lowered position (FIG. 7) relative to the latch 116. As shown in FIG. 6, the pivoting plates 196 are pivotally attached to the fixed plate 194 at a central incline pivot 198. A first pivoting plate shaft 200 extends through a first fixed plate opening 202 formed in the fixed plate 194 for connecting the pair of pivoting plates 196 on opposite sides of the fixed plate 194. Additionally, one or more second pivoting plate shafts 204 extend through one or more corresponding second fixed plate openings 206 for connecting the pair of pivoting plates 196 to one another. A biasing member 208 may be provided for biasing the pivoting plates 196 toward the raised position. The biasing member 208 may be provided within one of the second fixed plate openings 206 or, in embodiments, at any suitable location between the pivoting plates 196 and a bottom surface of the fixed plate 194. As shown, the biasing member 208 is a spring positioned below the fixed plate 194 for biasing the pivoting plates 196 toward the raised position.

Figure 7:
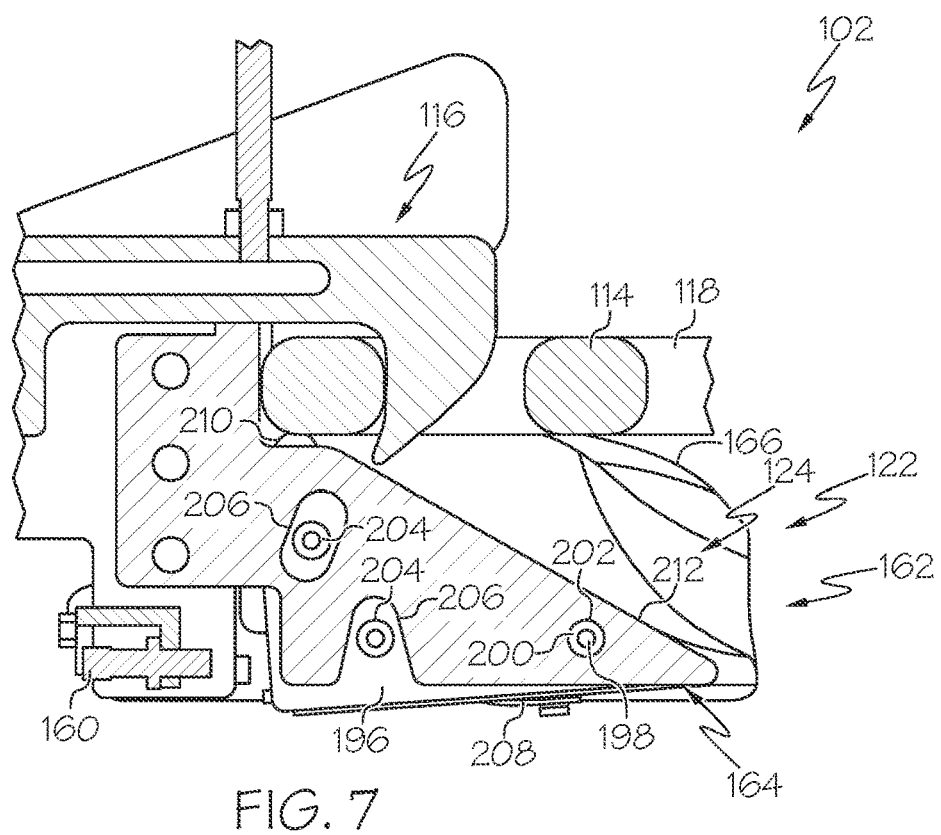
FIG. 7 schematically depicts a cross-section view of the receiving member of the hitch engaging a cart hook, according to the present disclosure.

As shown in FIGS. 6 and 7, the pivoting plates 196 include a lobe 210 extending above an upper surface 212 of the fixed plate 194 and above the upper surface 166 of the pair of inwardly curved side scoops 162 when in the raised position, but below the upper surface 166 of the pair of inwardly curved side scoops 162 when in the lowered position. As shown in FIG. 7, it should be appreciated that the lobe 210 is positioned so as to contact the engaging member 114 of the cart hook 108 when the cart hook 108 is received within the cavity 124 of the receiving member 122. Contact of the engaging member 114 with one of the lobes 210 causes one or both of the pivoting plates 196 to move toward the lowered position.

In embodiments, a cart hook transmitter is provided at a front surface of one of the pivoting plates 196. More particularly, the cart hook transmitter is positioned so as to be within a predetermined distance of the cart hook sensor 160 when the pivoting plates 196 are in the raised position such that the cart hook sensor 160 can identify that the pivoting plates 196 are in the raised position. Alternatively, as shown in FIG. 7, when the pivoting plates 196 are in the lowered position, such as when the cart hook 108 engages the latch 116, the cart hook transmitter is vertically displaced relative to the cart hook sensor 160 such that the cart hook sensor 160 does not identify the presence of the cart hook transmitter. Accordingly, the cart hook sensor 160 is configured to detect the presence of the cart hook 108 received within the receiving member 122 when the cart hook sensor 160 does not identify the presence of the cart hook transmitter, i.e., when the pivoting plates 196 are in the lowered position. Additionally, the cart hook sensor 160 may be configured to detect the lack of presence of the cart hook 108 within the receiving member 122 when the cart hook sensor 160 does identify the presence of the cart hook transmitter, i.e., when the pivoting plates 196 are in the raised position.

Figure 8:
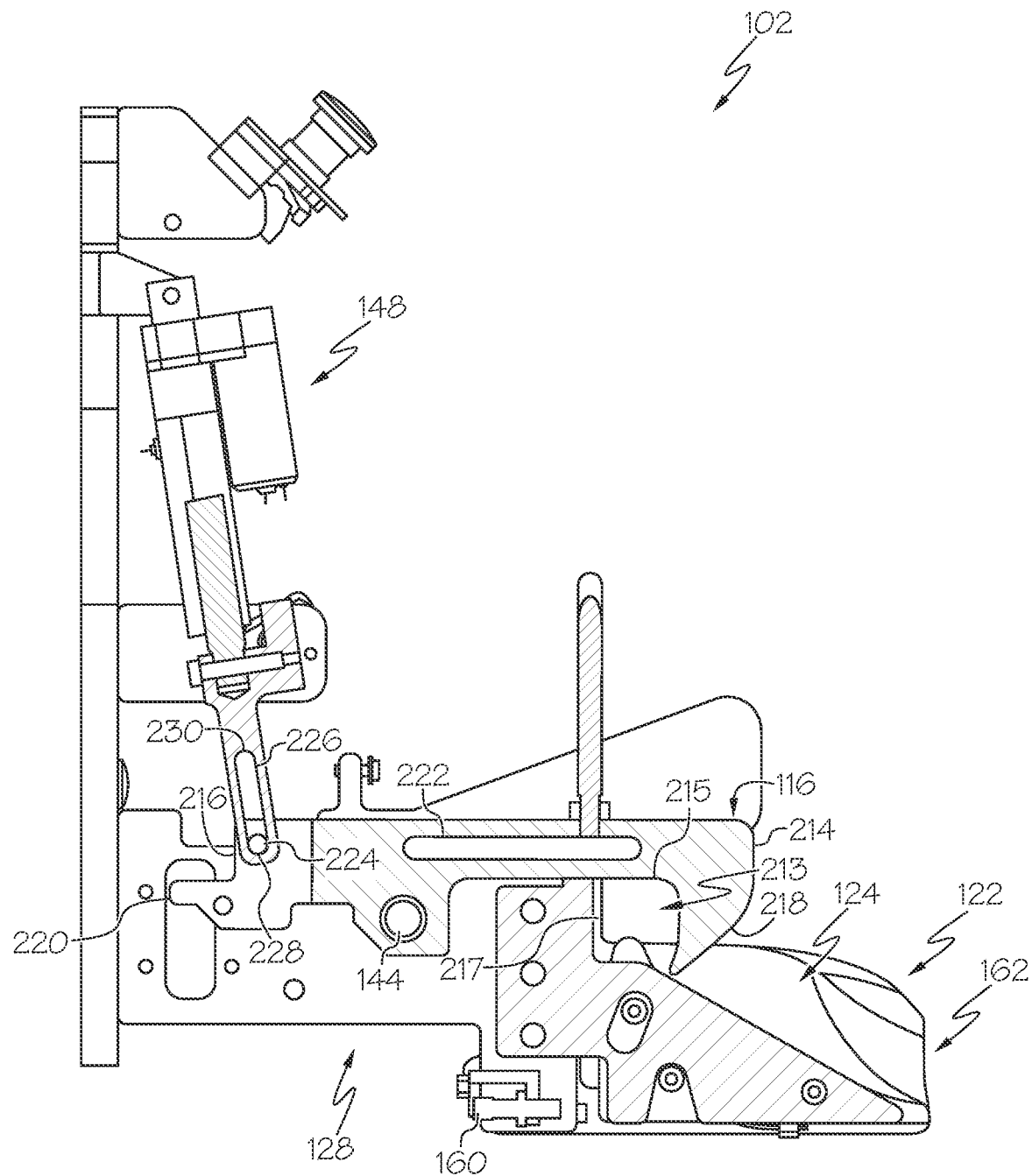
FIG. 8 schematically depicts a cross-section view of the hitch in a closed state, according to the present disclosure.

Referring now to FIG. 8, the latch 116 has a latch tooth end 214 and a latch pivoting end 216 opposite the latch tooth end 214. The latch tooth end 214 at least partially extends into the cavity 124 defined by the pair of inwardly curved side scoops 162 when the latch 116 is in the closed position. The latch tooth end 214 defines a latch rear surface 218 having a taper formed therein. The latch 116 is pivotally attached to the elongated frame member 128 at the latch pivot 144. The latch 116 has a latch finger 220 extending from the latch pivoting end 216. The latch finger 220 may include a latch transmitter for transmitting a signal to the first latch sensor 156 and the second latch sensor 158 for identifying a position of the latch 116 either in the open position or the closed position. When the hitch 102 is in the passive state, such that the latch 116 is in the closed position and permitted to move to the open position, contact by the engaging member 114 on the latch rear surface 218 will result in rotation of the latch 116 toward the open position and engagement with the cart hook 108.

Referring still to FIG. 8, the latch 116 at least partially defines a cart hook receiving space 213 positioned at least partially above the upper outer edge 186 of the pair of inwardly curved side scoops 162 when the latch 116 is in the closed position. The cart hook receiving space 213 is configured to receive the cart hook 108. In embodiments, the cart hook receiving space 213 is at least partially defined by the latch tooth end 214 of the latch 116, a latch body wall 215 of the latch 116 extending from the latch tooth end 214, and an upstanding front wall 217 of the receiving member 122. Due to the latch tooth end 214 of the latch 116 extending partially into the cavity 124 defined by the pair of inwardly curved side scoops 162 when the latch 116 is in the closed position, the cart hook receiving space 213 is positioned at least partially below the upper outer edge 186 of the pair of inwardly curved side scoops 162 when the latch 116 is in the closed position.

In embodiments, the latch 116 defines a latch cutout 222 formed in the latch 116 and extending between the latch tooth end 214 and the latch pivoting end 216. The latch cutout 222 may have an elliptical geometry and extends through opposite sides of the latch 116. In other embodiments, the latch cutout 222 may include a plurality of cutouts formed between the latch tooth end 214 and the latch pivoting end 216 such as, for example, a plurality of holes. The latch cutout 222 reduces a weight of the latch 116, thereby shifting the center of gravity of the latch 116 closer to the latch pivot 144 and facilitating pivoting of the latch 116 from the closed position to the open position upon contact of the cart hook 108.

Figure 9:
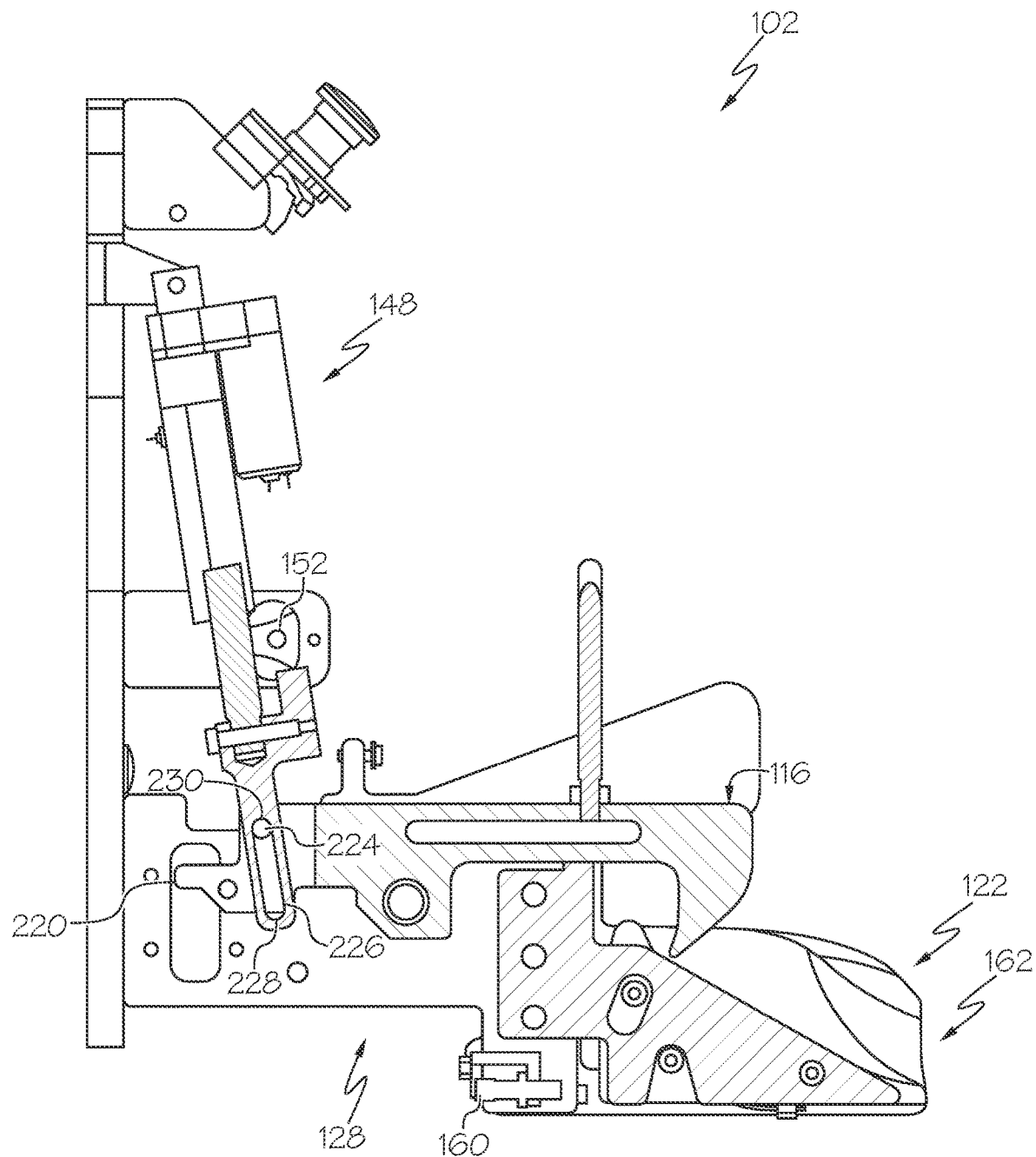
FIG. 9 schematically depicts a cross-section view of the hitch in a passive state and a latch in the closed position, according to the present disclosure.
Figure 10:
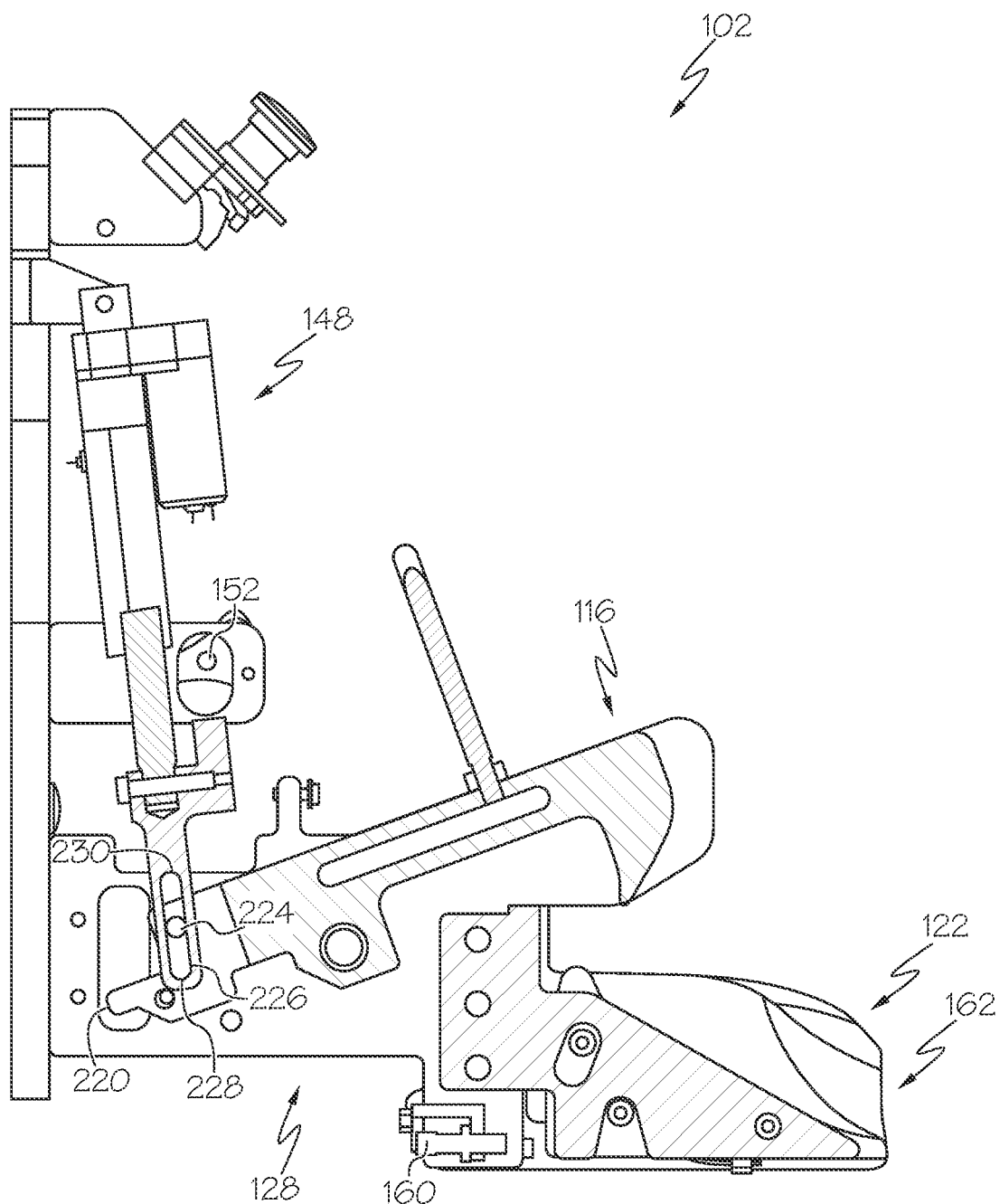
FIG. 10 schematically depicts a cross-section view of the hitch in the passive state and the latch in the open position, according to the present disclosure.
Figure 11:
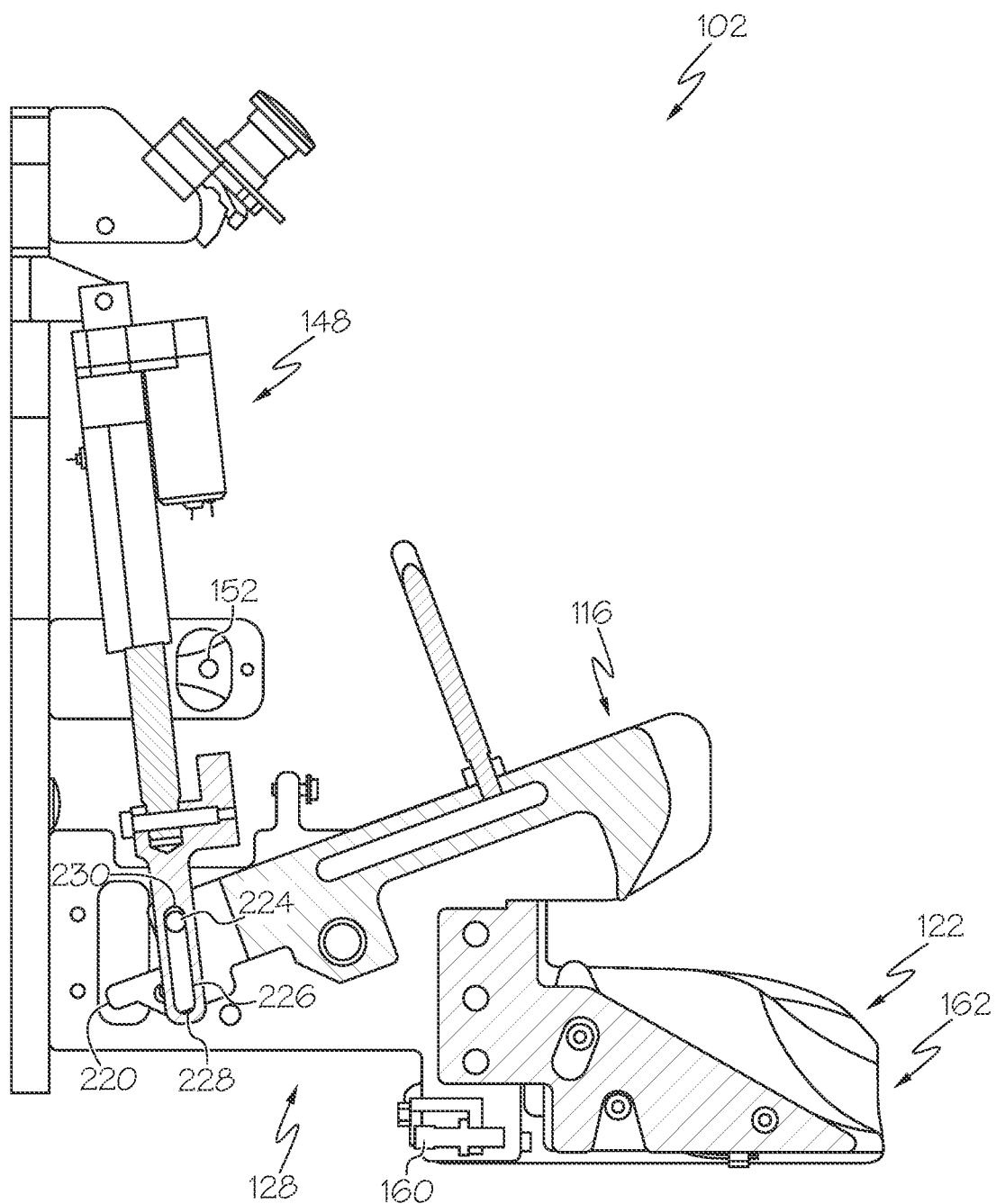
FIG. 11 schematically depicts a cross-section view of the hitch in an open state, according to the present disclosure.

Referring now to FIGS. 8-11, the latch 116 has a latch pin 224, which engages an actuator slot 226 formed in an end of the actuator 148. The actuator slot 226 extends along a longitudinal direction of the actuator 148 and has a lower end 228 and an upper end 230 opposite the lower end 228. As shown in FIG. 8, the hitch 102 is in the closed state such that the actuator 148 is in the retracted position and the latch 116 is in the closed position. Thus, the latch pin 224 is positioned at the lower end 228 of the actuator slot 226. In the closed state, the latch 116 is prohibited from pivoting about the elongated frame members 128 and into the open position. More specifically, the lower end 228 of the actuator slot 226 functions as a stop to prevent rotation of the latch 116 into the open position. When the latch 116 is in the closed position, as shown, the first latch sensor 156 (FIG. 5) detects the presence of the latch finger 220, thus identifying that the latch 116 is in the closed position. As shown in FIGS. 9 and 10, the hitch 102 is in the passive state such that the actuator 148 is in the intermediate position and the latch 116 is permitted to move between the open position and the closed position. Specifically, in FIG. 9, the actuator 148 is in the intermediate position and the latch 116 is in the closed position. It should be appreciated that an amount of extension of the actuator 148 when in the intermediate position is greater than an amount of extension of the actuator 148 when in the retracted position, but less than an amount of extension when in the extended position. When the actuator 148 is in the intermediate position and the latch 116 is in the closed position, the latch pin 224 is located closer to the upper end 230 of the actuator slot 226 compared to when the actuator 148 is in the intermediate position and the latch 116 is in the open position, as shown in FIG. 10. Additionally, when the actuator 148 is in the intermediate position and the latch 116 is in the closed position, the latch pin 224 is located closer to the upper end 230 of the actuator slot 226 as compared to when the actuator 148 is in the retracted position and the latch 116 is in the closed position. As shown in FIG. 11, the hitch 102 is in the open state such that the actuator 148 is in the extended position and the latch 116 is in the open position. Thus, the latch pin 224 is positioned at the upper end 230 of the actuator slot 226. In the open state, the latch 116 is prohibited from pivoting about the elongated frame member 128 and into the closed position. It should be appreciated that the upper end 230 of the actuator slot 226 pushes the latch pin 224 forcing the latch 116 into the open position. As such, the upper end 230 of the actuator slot 226 functions as a stop to prevent rotation of the latch 116 into the closed position. When the latch 116 is in the open position, as shown, the second latch sensor 158 (FIG. 5) detects the presence of the latch finger 220, thus identifying that the latch 116 is in the open position.

As discussed herein, in embodiments in which the hitch 102 may be automatically operated to detect the presence of a cart hook 108 within the receiving member 122 and controlling the actuator 148 to accordingly position the latch 116 into the open position and the closed position, the hitch 102 may include a plurality of sensors for detecting positions of various components of the hitch 102.

As discussed herein and referring again to FIG. 5, the hitch 102 includes the first latch sensor 156 configured to detect that the latch 116 is in the closed position, and the second latch sensor 158 configured to detect that the latch 116 is in the open position. The first latch sensor 156 and the second latch sensor 158, as shown, are mounted to either one or both of the elongated frame members 128. A latch sensor slot 232 is formed in either one or both of the elongated frame members 128 to permit the first latch sensor 156 and the second latch sensor 158 to identify the presence of the latch finger 220 of the latch 116 when in the open position and the closed position.

The hitch 102 also includes the first actuator sensor 152 (FIG. 3) configured to detect that the actuator 148 is in the retracted position and the second actuator sensor 154 configured to detect that the actuator 148 is in the intermediate position. The first actuator sensor 152 and the second actuator sensor 154, as shown, are mounted to either one of the medial frame members 138. An actuator sensor slot 234 is formed in either one or both of the medial frame members 138 to permit the first actuator sensor 152 and the second actuator sensor 154 to identify the presence of the actuator 148 when in the retracted position and the intermediate position, respectively. It should be appreciated that it may be determined that actuator 148 is in the extended position merely when no determination is made that the actuator 148 is in the retracted position or the intermediate position. Alternatively, a third actuator sensor may be positioned on a side of the second actuator sensor 154 opposite the first actuator sensor 152 for specifically determining that the actuator 148 is in the extended position.

Lastly, the hitch 102 includes the cart hook sensor 160 configured to detect that the pivoting plates 196 of the receiving member 122 are in the raised position. Specifically, the cart hook sensor 160 is configured to detect the presence of the cart hook 108 received within the receiving member 122. The cart hook sensor 160 may be mounted to one or both of the elongated frame members 128. As discussed herein, the cart hook sensor 160 detects that the cart hook 108 is received within the receiving member 122 when the one or more pivoting plates 196 is in the lowered position, and the cart hook sensor 160 detects that a cart hook 108 is not received within the receiving member 122 when the one or more pivoting plates 196 is in the raised position.

It should be appreciated that the sensors discussed herein may be any suitable sensor for detecting the presence of a component. For example, the sensors may be proximity sensors for detecting the presence of a corresponding component, motion sensors for detecting when a corresponding component is moved into range of the sensor, or a sensor receiving a signal from a transmitter mounted onto the corresponding component. Additional types of sensors not specifically disclosed herein are within the scope of the present disclosure.

Referring still to FIG. 5, each of the first latch sensor 156, the second latch sensor 158, the first actuator sensor 152, the second actuator sensor 154, and the cart hook sensor 160 may be movably mounted to the hitch 102 such that a vertical position of the sensors may be adjusted to accurately detect a corresponding component, such as the actuator 148, the latch 116, or the pivoting plates 196, respectively. Specifically, a first latch sensor mount 236 is provided for movably mounting the first latch sensor 156 to the hitch 102, a second latch sensor mount 238 is provided for movably mounting the second latch sensor 158 to the hitch 102, a first actuator sensor mount 240 is provided for movably mounting the first actuator sensor 152 to the hitch 102, and a second actuator sensor mount 242 is provided for movably mounting the second actuator sensor 154 to the hitch 102. It should be appreciated that the structure of the first latch sensor mount 236, the second latch sensor mount 238, the first actuator sensor mount 240, and the second actuator sensor mount 242 have identical structure and thus only the structure of the first actuator sensor mount 240 is discussed in detail herein.

The first latch sensor mount 236 includes a mount body 244 having a first end 246 pivotally attached to the hitch 102, particularly one or both of the elongated frame members 128, and a second end 248 opposite the first end 246. The first latch sensor 156 extends through the mount body 244 between the first end 246 and the second end 248 and is fixed thereto. An arcuate slot 250 is formed at the second end 248 and an adjustable fastener 252 extends through the arcuate slot 250 for fixing the mount body 244 relative to the hitch 102. As the adjustable fastener 252 is loosened, the mount body 244 is permitted to rotate about the first end 246 of the mount body 244. Pivoting of the mount body 244 in a first direction will raise the vertical position of the first latch sensor 156 while pivoting of the mount body 244 in an opposite second direction will lower the vertical position of the first latch sensor 156.

Although not shown in detail, a cart hook sensor mount 254 is also provided for movably mounting the cart hook sensor 160 to the hitch 102 and permitting adjustment of a vertical position of the cart hook sensor 160.

Figure 12:
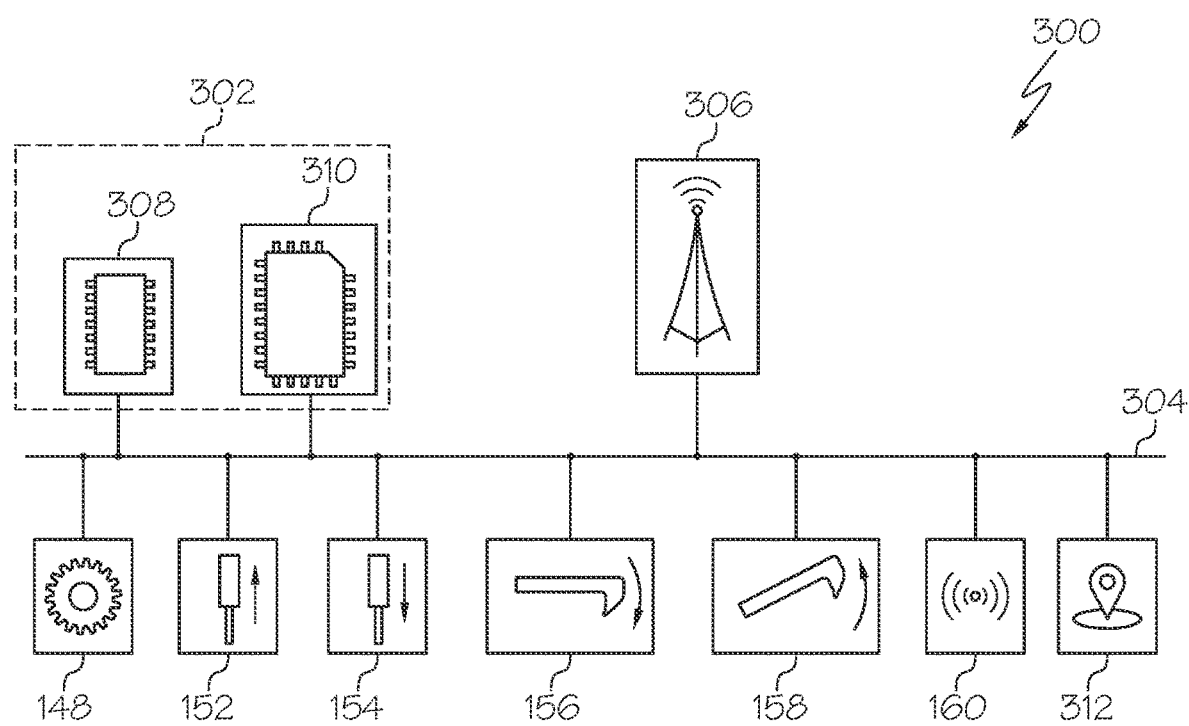
FIG. 12 schematically depicts components of a hitch system, according to the present disclosure.

Referring now to FIG. 12, a schematic diagram of an automatic hitch system 300 is depicted illustrating individual hardware components thereof, as discussed herein and with reference to FIGS. 1-11. In embodiments, the automatic hitch system 300 includes a hitch controller 302, a communication path 304, and network interface hardware 306. The communication path 304 may be formed from any medium that is capable of transmitting a signal such as, for example, conductive wires, conductive traces, optical waveguides, or the like. Moreover, the communication path 304 may be formed from a combination of mediums capable of transmitting signals. In one embodiment, the communication path 304 includes a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 304 communicatively couples the various components of the automatic hitch system 300. As used herein, the term "communicatively coupled" means that coupled components are capable of exchanging data signals with one another such as, for example, electrical signals via conductive medium, electromagnetic signals via air, optical signals via optical waveguides, and the like.

As noted above, the automatic hitch system 300 includes the hitch controller 302 including one or more processors 308 and one or more memory modules 310. Each of the one or more processors 308 may be any device capable of executing machine readable instructions. Accordingly, each of the one or more processors 308 may be an integrated circuit, a microchip, a computer, or any other computing device. The one or more processors 308 are communicatively coupled to the other components of the automatic hitch system 300 by the communication path 304. Accordingly, the communication path 304 may communicatively couple any number of processors with one another, and allow the modules coupled to the communication path 304 to operate in a distributed computing environment. Specifically, each of the modules may operate as a node that may send and/or receive data.

Each of the one or more memory modules 310 of the automatic hitch system 300 is coupled to the communication path 304 and communicatively coupled to the one or more processors 308. The one or more memory modules 310 may include RAM, ROM, flash memories, hard drives, or any device capable of storing machine readable instructions such that the machine readable instructions may be accessed and executed by the one or more processors 308. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 310. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

As noted above, the automatic hitch system 300 includes the network interface hardware 306 for wirelessly communicatively coupling the automatic hitch system 300 with other communication devices, such as a central server, a mobile device, and the like. The network interface hardware 306 is coupled to the communication path 304 such that the communication path 304 communicatively couples the network interface hardware 306 to other modules of the automatic hitch system 300. The network interface hardware 306 may be any device capable of transmitting and/or receiving data via a wireless network. Accordingly, the network interface hardware 306 may include a communication transceiver for sending and/or receiving data according to any wireless communication standard. For example, the network interface hardware 306 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 306 includes a Bluetooth® transceiver that enables the automatic hitch system 300 to exchange information with a mobile device such as, for example, a smartphone, via Bluetooth® communication.

In embodiments, the automatic hitch system 300 further includes the actuator 148, the first actuator sensor 152, the second actuator sensor 154, the first latch sensor 156, the second actuator sensor 154, and the cart hook sensor 160.

The actuator 148, the first actuator sensor 152, the second actuator sensor 154, the first latch sensor 156, the second actuator sensor 154, and the cart hook sensor 160 may be coupled to the communication path 304 such that the communication path 304 communicatively couples the actuator 148, the first actuator sensor 152, the second actuator sensor 154, the first latch sensor 156, the second actuator sensor 154, and the cart hook sensor 160 to other modules of the automatic hitch system 300.

In embodiments, the automatic hitch system 300 further includes a location sensor 312 for determining a location of the hitch 102. The location sensor 312 may be coupled to the communication path 304 such that the communication path 304 communicatively couples the location sensor 312 to other modules of the automatic hitch system 300. The location sensor 312 may be, for example, a GPS module, configured to capture location data indicating a location of the hitch 102, which may be transmitted to the hitch controller 302. The location data may be compared to location data of a cart pickup location to identify that the materials handling vehicle 100 has arrived at the cart 106, and/or a target destination to identify that the materials handling vehicle 100 has arrived at a final destination of the cart 106.

In embodiments, the hitch controller 302 determines whether the materials handling vehicle 100 has arrived at the pickup location of the cart 106. In embodiments, the hitch controller 302 determines the position of the actuator 148, the position of the latch 116, and whether the cart hook 108 is received within the receiving member 122. Specifically, the hitch controller 302 determines whether the actuator 148 is in the retracted position or the intermediate position based on signals received from the first actuator sensor 152 and the second actuator sensor 154. In embodiments, the hitch controller 302 may determine when the actuator 148 is in the extended position based on a failure to determine that the actuator 148 is in one of the retracted position and the intermediate position. Additionally, the hitch controller 302 determines whether the latch 116 is in the closed position or the open position based on signals received from the first latch sensor 156 and the second latch sensor 158 detecting the latch finger 220 of the latch 116. Lastly, the hitch controller 602 determines whether the cart hook 108 is received within the receiving member 122 based on signals received from the cart hook sensor 160 indicating that the pivoting plates 196 are in the lowered position.

Based on the above determinations made by the hitch controller 302, the actuator 148 may be operated to permit the cart hook 108 to engage the latch 116 at the pickup location, maintain engagement with the cart hook 108 until the materials handling vehicle 100 has reached the target destination, and disengage the cart hook 108 upon reaching the target destination.

Specifically, in response to detecting that the materials handling vehicle 100 has arrived at the pickup location of the cart 106, the actuator 148 may be positioned into the intermediate position such that the hitch 102 is in the passive state and the latch 116 is capable of receiving the cart hook 108 upon contact of the engaging member 114 of the cart hook 108 with the latch rear surface 218 of the latch 116. The hitch controller 302 determines that the actuator 148 is in the intermediate position in response to no signal being received from one or more of the first actuator sensor 152 and the second actuator sensor 154. When the actuator 148 is in the intermediate position, the hitch controller 302 is configured to determine whether the latch 116 is in the closed position in response to receiving a signal from the first latch sensor 156 and that the latch 116 is in the open position in response to receiving a signal from the second latch sensor 158.

In response to receiving a signal from the cart hook sensor 160 that the pivoting plates 196 are in the lowered position, the hitch controller 302 determines that the cart hook 108 is positioned within the receiving member 122 and engaged with the latch 116. As a secondary verification method for confirming that the cart hook 108 is positioned within the receiving member 122 and engaged with the latch 116, the hitch controller 302 identifies that the latch 116 moved from the closed position, to the open position, and back to the closed position in response to respective signals received from the first latch sensor 156 indicating the latch 116 is initially in the closed position, subsequently receiving a signal from the second latch sensor 158 indicating the latch 116 is moved into the open position or alternatively a lack of signal received from the first latch sensor 156, and subsequently receiving another signal from the first latch sensor 156 indicating the latch 116 is back in the closed position. The hitch controller 302 may receive the signal from the cart hook sensor 160 when the latch 116 is subsequently positioned back into closed position. This secondary verification method is useful in instances in which one or more of the latch 116 and the pivoting plates 196 change positions, such as for example when the materials handling vehicle 100 travels over a bump, without actually receiving the cart hook 108.

As discussed herein, the hitch controller 302 is configured to position the actuator 148 between the retracted position, the intermediate position, and the extended position in response to receiving signals from the first latch sensor 156, the second latch sensor 158, and/or the cart hook sensor 160. As such, in response to the hitch controller 302 determining that the cart hook 108 has engaged the latch 116, the actuator 148 may be positioned into the retracted position such that the hitch 102 is in the closed state and the latch 116 is not permitted to move to the open position.

Upon the hitch controller 302 determining that the materials handling vehicle 100 has arrived at the target destination based on the location data received from the location sensor 312, the hitch controller 302 may be configured to position the actuator 148 into the extended position. As discussed herein, positioning the actuator 148 into the extended position forces the latch 116 into the open position. As such, the materials handling vehicle 100 may be moved in a direction away from the cart 106 to disengage the cart 106 from the hitch 102. Once the hitch controller 302 determines that the cart hook 108 is no longer engaged with the latch 116 and received within the receiving member 122, such as indicated by the cart hook sensor 160, the hitch controller 302 may position the actuator 148 into the intermediate position to permit the latch 116 to freely move between the closed position and the open position.

It is also noted that recitations herein of "at least one" or "one or more" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A materials handling vehicle comprising a hitch, and a drive mechanism, wherein:
   the hitch comprises a latch and a receiving member;
   the latch is positionable between an open position and a closed position;
   the receiving member comprises a pair of inwardly curved side scoops and a central incline member provided between the pair of inwardly curved side scoops, each inwardly curved side scoop having an upper surface, a lower surface opposite the upper surface, an inner surface, an outer surface opposite the inner surface, a rear surface, and a front surface opposite the rear surface;
   the rear surface and the upper surface of the pair of inwardly curved side scoops define an open rear end of the receiving member, the upper surface being sloped at the open rear end; and
   the central incline member and the upper surface of the pair of inwardly curved side scoops cooperate to lead a cart hook to engage the latch, the central incline member comprising a fixed plate and one or more pivoting plates pivotally attached to the fixed plate, the one or more pivoting plates positionable between a raised position and a lowered position relative to the latch.

2. The materials handling vehicle of claim 1, wherein each of the pair of inwardly curved side scoops has an upper rear edge formed at an intersection of the upper surface and the rear surface, the upper rear edge extending from the inner surface to the outer surface, the rear surface tapering at least partially from the outer surface to the inner surface.

3. The materials handling vehicle of claim 2, wherein the rear surface has a first rear surface height at the inner surface and a second rear surface height at the outer surface greater than the first rear surface height.

4. The materials handling vehicle of claim 2, wherein the upper rear edge has a curved upper rear edge portion formed between the inner surface and the outer surface.

5. The materials handling vehicle of claim 2, wherein each of the pair of inwardly curved side scoops has an upper outer edge formed at an intersection of the upper surface and the outer surface, the outer surface tapering toward the rear surface.

6. The materials handling vehicle of claim 5, wherein the latch at least partially defines a cart hook receiving space positioned at least partially above the upper outer edge of the pair of inwardly curved side scoops when the latch is in the closed position, the cart hook receiving space configured to receive the cart hook.

7. The materials handling vehicle of claim 6, wherein the cart hook receiving space is at least partially defined by a latch tooth end of the latch, a latch body wall of the latch extending from the latch tooth end, and an upstanding front wall of the receiving member.

8. The materials handling vehicle of claim 6, wherein the cart hook receiving space is positioned at least partially below the upper outer edge of the pair of inwardly curved side scoops when the latch is in the closed position.

9. The materials handling vehicle of claim 5, wherein the outer surface has a first outer surface height at the front surface and a second outer surface height at the rear surface less than the first outer surface height.

10. The materials handling vehicle of claim 5, wherein a trailing arm of the cart hook is guided to ride up one of the pair of inwardly curved side scoops as the materials handling vehicle turns relative to the cart hook.

11. The materials handling vehicle of claim 10, wherein the trailing arm of the cart hook is guided to ride along the upper rear edge and subsequently the upper outer edge of one of the pair of inwardly curved side scoops as the materials handling vehicle turns relative to the cart hook.

12. The materials handling vehicle of claim 11, wherein, when the materials handling vehicle is in a turned position, the trailing arm of the cart hook is positioned above the upper rear edge and the cart hook is engaged with the latch.

13. The materials handling vehicle of claim 5, wherein, the latch extends above the upper outer edge of the each of the pair of inwardly curved side scoops to permit engagement with the cart hook above the upper outer edge of the each of the pair of inwardly curved side scoops.

14. The materials handling vehicle of claim 1, wherein a gap is provided between the inner surface of each of the pair of inwardly curved side scoops.

15. The materials handling vehicle of claim 14, wherein the central incline member is provided within the gap.

16. The materials handling vehicle of claim 15, wherein the central incline member has a tapered upper surface conforming to a slope of the upper surface of the pair of inwardly curved side scoops at the inner surface of the pair of inwardly curved side scoops.

17. The materials handling vehicle of claim 1, wherein the one or more pivoting plates comprises a lobe extending above an upper surface of the fixed plate when in the raised position and below the upper surface of the fixed plate when in the lowered position.

18. The materials handling vehicle of claim 1, wherein the one or more pivoting plates are biased toward the raised position.

19. The materials handling vehicle of claim 1, wherein the central incline member comprises a pair of pivoting plates pivotally attached to opposite sides of the fixed plate.

20. The materials handling vehicle of claim 1, wherein the latch has a latch tooth end and a latch pivoting end opposite the latch tooth end, the latch tooth end at least partially extending into a cavity defined by the pair of inwardly curved side scoops when in the closed position.

21. The materials handling vehicle of claim 20, wherein the latch tooth end defines a latch rear surface having a taper formed therein.

22. The materials handling vehicle of claim 1, further comprising an actuator, wherein the actuator is positionable between a retracted position, an intermediate position, and an extended position, and is configured to position the latch into the open position when the actuator is in the extended position, position the latch into the closed position when the actuator is in the retracted position, and permit movement of the latch between the open position and the closed position when the actuator is in the intermediate position.

23. The materials handling vehicle of claim 22, wherein the latch has a latch pin engaging an actuator slot formed in an end of the actuator.

24. The materials handling vehicle of claim 23, wherein, when the actuator is in the retracted position and the latch is in the closed position, the latch pin is positioned at a lower end of the actuator slot.

25. The materials handling vehicle of claim 24, wherein, when the actuator is in the extended position, an upper end of the actuator slot pushes the latch pin forcing the latch into the open position, the upper end of the actuator slot being opposite the lower end of the actuator slot.

26. The materials handling vehicle of claim 25, wherein, when the actuator is in the intermediate position and the latch is in the open position, the latch pin is closer to the lower end than the upper end of the actuator as compared to when the actuator is in the intermediate position and the latch is in the closed position.

27. A hitch comprising a latch and a receiving member, wherein:
the latch is positionable between an open position and a closed position;
the receiving member comprises a pair of inwardly curved side scoops and a central incline member provided between the pair of inwardly curved side scoops, each inwardly curved side scoop having an upper surface, a lower surface opposite the upper surface, an inner surface, an outer surface opposite the inner surface, a rear surface, and a front surface opposite the rear surface;
the rear surface and the upper surface of the pair of inwardly curved side scoops define an open rear end of the receiving member, the upper surface being sloped at the open rear end; and
the central incline member and the upper surface of the pair of inwardly curved side scoops cooperate to lead a cart hook to engage the latch, the central incline member comprising a fixed plate and one or more pivoting plates pivotally attached to the fixed plate, the one or more pivoting plates positionable between a raised position and a lowered position relative to the latch.

28. A materials handling vehicle comprising a hitch, and a drive mechanism, wherein:
the hitch comprises a latch, and a receiving member;
the latch is positionable between an open position and a closed position;
the receiving member comprises a pair of inwardly curved side scoops and a central incline member comprising a fixed plate and one or more pivoting plates pivotally attached to the fixed plate, the one or more pivoting plates positionable between a raised position and a lowered position relative to the latch; and
the receiving member is configured such that a trailing arm of a cart hook is guided to ride up one of the pair of inwardly curved side scoops as the materials handling vehicle turns relative to the cart hook.

* * * * *